(12) United States Patent
Kostakis et al.

(10) Patent No.: US 11,568,320 B2
(45) Date of Patent: Jan. 31, 2023

(54) HANDLING SYSTEM-CHARACTERISTICS DRIFT IN MACHINE LEARNING APPLICATIONS

(71) Applicant: SNOWFLAKE INC., San Mateo, CA (US)

(72) Inventors: Orestis Kostakis, Redmond, WA (US); Qiming Jiang, Redmond, WA (US); Boxin Jiang, Sunnyvale, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/154,928

(22) Filed: Jan. 21, 2021

(65) Prior Publication Data

US 2022/0230093 A1 Jul. 21, 2022

(51) Int. Cl.
*G06N 20/00* (2019.01)
*G06F 16/24* (2019.01)

(52) U.S. Cl.
CPC ............ *G06N 20/00* (2019.01); *G06F 16/24* (2019.01)

(58) Field of Classification Search
CPC ....... G06N 20/00; G06F 16/24; G06F 16/951; G06F 16/9535; G06F 16/24578
USPC .......................................................... 707/14
See application file for complete search history.

(56) References Cited

U.S. PATENT DOCUMENTS

| | | | |
|---|---|---|---|
| 10,599,957 B2 * | 3/2020 | Walters | G06F 16/215 |
| 10,776,721 B1 * | 9/2020 | Shi | G06N 3/04 |
| 10,832,087 B1 * | 11/2020 | Wang | H04B 17/3913 |
| 2011/0302193 A1 * | 12/2011 | Liu | G06F 16/338 707/769 |
| 2017/0330109 A1 * | 11/2017 | Maughan | G06N 5/04 |
| 2018/0314735 A1 * | 11/2018 | Liu | G06F 16/24532 |
| 2020/0081916 A1 * | 3/2020 | McShane | G06F 3/0486 |
| 2020/0082296 A1 * | 3/2020 | Fly | G06F 11/327 |
| 2020/0117580 A1 * | 4/2020 | Lekivetz | G06F 11/3684 |
| 2020/0125844 A1 * | 4/2020 | She | G06Q 50/02 |
| 2020/0151619 A1 * | 5/2020 | Mopur | G06N 3/08 |
| 2020/0183936 A1 * | 6/2020 | Ramesh | G06N 20/00 |
| 2020/0349161 A1 * | 11/2020 | Siddiqui | G06F 16/24542 |

OTHER PUBLICATIONS

PCT International Search Report and Written Opinion from related PCT Application No. PCT/US2022/012789, dated Feb. 7, 2022, 9 pages.

* cited by examiner

*Primary Examiner* — Hosain T Alam
*Assistant Examiner* — Nicholas E Allen
(74) *Attorney, Agent, or Firm* — Womble Bond Dickinson (US) LLP

(57) ABSTRACT

Systems and methods for managing input and output error of a machine learning (ML) model in a database system are presented herein. A set of test queries is executed on a first version of a database system to generate first test data, wherein the first version of the system comprises a ML model to generate an output corresponding to a function of the database system. An error model is trained based on the first test data and second test data generated based on a previous version of the system. The error model determines an error associated with the ML model between the first and previous versions of the system. The first version of the system is deployed with the error model, which corrects an output or an input of the ML model until sufficient data has been produced by the error model to retrain the ML model.

20 Claims, 9 Drawing Sheets

HANDLING SYSTEM-CHARACTERISTICS DRIFT IN MACHINE LEARNING APPLICATIONS

TECHNICAL FIELD

Aspects of the present disclosure relate to database systems, and more particularly, to the use of machine learning (ML) in database systems.

BACKGROUND

Databases are widely used for data storage and access in computing applications. Databases may include one or more tables that include or reference data that can be read, modified, or deleted using queries. Databases can store small or extremely large sets of data within tables. A database system comprising a database (e.g., storage resources) may also comprise computing resources that allow the stored data to be queried by various users in an organization or even be used to service public users, such as via a website or an application program interface (API). Both computing and storage resources, as well as their underlying architecture, can play a large role in achieving desirable database performance.

Database systems are increasingly integrating ML models to perform functions such as e.g., query optimization, where the database system finds the best physical execution path for a query. Various approaches to the use of ML in database systems exist, including reinforcement learning, deep learning, dimensional reduction, and topic modeling, among others.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1A:
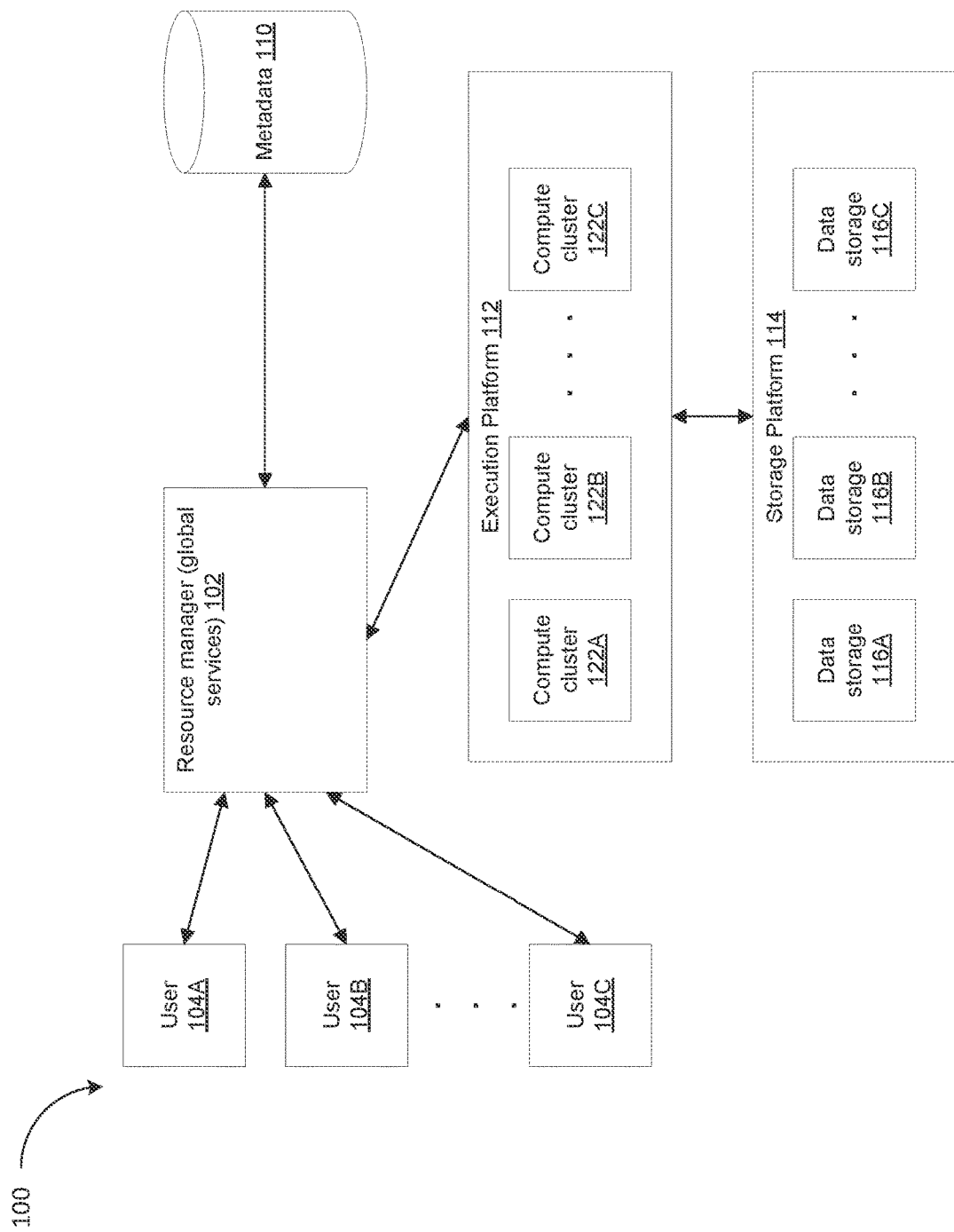
FIG. 1A is a block diagram that illustrates an example database system, in accordance with some embodiments of the present disclosure.

Database systems may implement numerous query processing sub-systems (also referred to herein as "query processing components" or "components") such as query execution engines, resource predictors (e.g., for determining the optimal amount of resources to run a given query), query allocators (e.g., to handle allocation of tasks/micro-partitions of a query among compute clusters), and query optimizers, among others. Database systems may replace the functions/heuristics of one or more of these components by using ML models. The typical workflow consists of gathering a set of data, training an ML model to automate a query processing component, and deploying it to a production version of the database system. ML models may be retrained and redeployed either at regular intervals, or when the ML model drops below some performance-level threshold, at which point the process of gathering data and training a new ML model to replace the previous one is repeated. Hence new ML models are trained and/or evaluated using a mixture of new and old data.

However, it is erroneous to assume that past system data will remain correct over time. Indeed, this is often not the case in scenarios where the system data corresponds to the operations of query processing components (e.g. a query execution engine). Such query processing components are frequently updated, augmented, and/or repaired and may thus "drift." In other words, the actual output of or input to the component has drifted away from what is expected by the ML model that is simulating the query processing component. This is because the ML model's expectations are based on a previous version of the system (i.e., the ML model was trained on data gathered from executions of the previous version of the system where the query processing component was unmodified).

If any such query processing components are modified (e.g., the operation of the query execution engine or query optimizer is modified), the assumptions of an ML model simulating any of those components may no longer be valid. For example, modifications to a query optimizer may render the assumptions of an ML model simulating the query optimizer (or an ML model simulating a resource predictor component that depends on the output of the query optimizer) invalid. In these situations, the ML model needs to be retrained in order to continue accurately simulating the component it is meant to replace. However, the process of retraining an ML model may take a significant amount of time (e.g., days or weeks), during which the ML model may produce unreliable/inaccurate output.

The present disclosure addresses the above-noted and other deficiencies by using a processing device to execute a set of test queries on a first version of a database system to generate first test data, wherein the first version of the system comprises a machine learning (ML) model to generate an output corresponding to a function of the database system. The processing device may train an error model based on the first test data and second test data generated from executing the set of test queries on a previous version of the system, the error model to determine an output error of the ML model between the first and previous versions of the database system. The processing device may deploy the first version of the database system with the error model and, in response to the ML model generating a first output based on a received input, may adjust, by the error model, the first output of the ML model based on the input to the ML model and the output error of the ML model.

In other embodiments, the present disclose may address the above-noted and other deficiencies by using a processing device to execute a set of test queries on a first version of a database system to generate first test data, wherein the first version of the system comprises a machine learning (ML) model to generate an output corresponding to a function of the database system. The processing device may train an error model based on the first test data and second test data generated from executing the set of test queries on a previous version of the system, the error model to determine an input error of the ML model between the first and previous versions of the database system. The processing device may deploy the first version of the database system with the error model and, may adjust, by the error model, an input directed to the ML model based on the input error of the ML model. The processing device may output the adjusted input to the ML model.

FIG. 1A is a block diagram illustrating a database system 100, according to one embodiment. The database system 100 includes a resource manager 102 that is accessible by multiple users 104A, 104B, and 104C. The resource manager 102 may also be referred to herein as a database service manager. In some implementations, resource manager 102 can support any number of users desiring access to data or services of the database system 100. Users 104A, 104B, and 104C may include, for example, end users providing data storage and retrieval queries and requests, system administrators managing the systems and methods described herein, software applications that interact with a database, and other components/devices that interact with resource manager 102.

FIG. 1A and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The resource manager 102 may provide various services and functions that support the operation of the systems and components within the database system 100. Resource manager 102 has access to stored metadata 110 associated with the data stored throughout data database system 100. The resource manager 102 may use the metadata 110 for optimizing user queries. In some embodiments, metadata 110 includes a summary of data stored in remote data storage devices 116 on storage platform 114 as well as data available from a local cache (e.g., a cache within one or more of the compute clusters 122 of the execution platform 112). Additionally, metadata 110 may include information regarding how data is organized in the remote data storage devices and the local caches. Metadata 110 allows systems and services to determine whether a piece of data needs to be processed without loading or accessing the actual data from a remote data storage device.

Metadata 110 may be collected when changes are made to the data stored in database system 100 using a data manipulation language (DML), which changes may be made by way of any DML statement. Examples of manipulating data may include, but are not limited to, selecting, updating, changing, merging, and inserting data into tables. As part of the database system 100, files may be created and the metadata 110 may be collected on a per file and a per column basis, after which the metadata 110 may be saved in a metadata store. This collection of metadata 110 may be performed during data ingestion or the collection of metadata 110 may be performed as a separate process after the data is ingested or loaded. In an implementation, the metadata 110 may include a number of distinct values; a number of null values; and a minimum value and a maximum value for each file. In an implementation, the metadata may further include string length information and ranges of characters in strings.

Resource manager 102 is further in communication with an execution platform 112, which provides multiple computing resources that execute various data storage and data retrieval operations, as discussed in greater detail below. The execution platform 112 may include one or more compute clusters that may be logically organized into one or more virtual warehouses (referred to herein as "warehouses"). Each compute cluster may be dynamically allocated or suspended for specific warehouses, based on the query workload provided by the users 104A, 104B, and 104C to a specific warehouse. The execution platform 112 is in communication with one or more of the data storage devices 116 that are part of the storage platform 114. Although three data storage devices 116 are shown in FIG. 1A, the execution platform 112 is capable of communicating with any number of data storage devices. In some embodiments, data storage devices 116 are cloud-based storage devices located in one or more geographic locations. For example, data storage devices 116 may be part of a public cloud infrastructure or a private cloud infrastructure, or any other manner of distributed storage system. Data storage devices 116 may include hard disk drives (HDDs), solid state drives (SSDs), storage clusters, or any other data storage technology. Additionally, the storage platform 114 may include a distributed file system (such as Hadoop Distributed File Systems (HDFS)), object storage systems, and the like.

In some embodiments, the communication links between resource manager 102 and users 104A, 104B, and 104C, metadata 110, and execution platform 112 are implemented via one or more data communication networks and may be assigned various tasks such that user requests can be optimized. Similarly, the communication links between execution platform 112 and data storage devices 116 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1A, data storage devices 116 are decoupled from the computing resources associated with execution platform 112. This architecture supports dynamic changes to the data database system 100 based on the changing data storage/retrieval needs, computing needs, as well as the changing needs of the users and systems accessing data database system 100. The support of dynamic changes allows data database system 100 to scale quickly in response to changing demands on the systems and components within data database system 100. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The resource manager 102, metadata 110, execution platform 112, and storage platform 114 are shown in FIG. 1A as individual components. However, each of resource manager 102, metadata 110, execution platform 112, and storage platform 114 may be implemented as a distributed system (e.g., distributed across multiple systems/platforms at multiple geographic locations) or may be combined into one or more systems. Additionally, each of the resource manager 102, storage for metadata 110, the execution platform 112, and the storage platform 114 can be scaled up or down (independently of one another) depending on changes to the requests received from users 104A, 104B, and 104C and the changing needs of the data database system 100. Thus, in the described embodiments, the database system 100 is dynamic and supports regular changes to meet the current data processing needs.

Each of the resource manager 102, execution platform 112, and storage platform 114 may comprise any suitable type of computing device or machine that has one or more programmable processors including, for example, server computers, storage servers, desktop computers, laptop computers, tablet computers, and smartphones, etc. Each of the resource manager 102, execution platform 112, and storage platform 114 may comprise a single machine or may include multiple interconnected machines (e.g., multiple servers configured in a cluster). In addition, each of the resource manager 102, execution platform 112, and storage platform 114 may include hardware such as processing devices (e.g., processors, central processing units (CPUs)), memory (e.g., random access memory (RAM), storage devices (e.g., harddisk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

The execution platform 112 includes a plurality of compute clusters 122 which may share a compute or processing load of the database system 100. In one embodiment, customers can control the number of active (i.e. running) clusters by specifying a range (e.g., specifying values such as minClusterCount and maxClusterCount) when creating a warehouse or changing its configuration (both while the warehouse is running and while it is suspended). Customers may specify an exact number of active clusters by specifying, for example, making the minimum cluster count equal to the maximum cluster count so that the warehouse will have that exact number running whenever it is running. If a user specifies a maximum cluster count that is greater than a minimum cluster count, the resource manager 102 may automatically manage the number of currently active clusters based on the workload to satisfy the throughput criteria and to be cost-effective. So, whenever the warehouse is running, at least a minimum cluster count (minClusterCount) of clusters are active, and at most a maximum cluster count (maxClusterCount) of clusters are active. The resource manager 102 may decide how many clusters are required to handle the current workload given the specified performance criteria in terms of memory load and concurrency level.

Figure 1B:
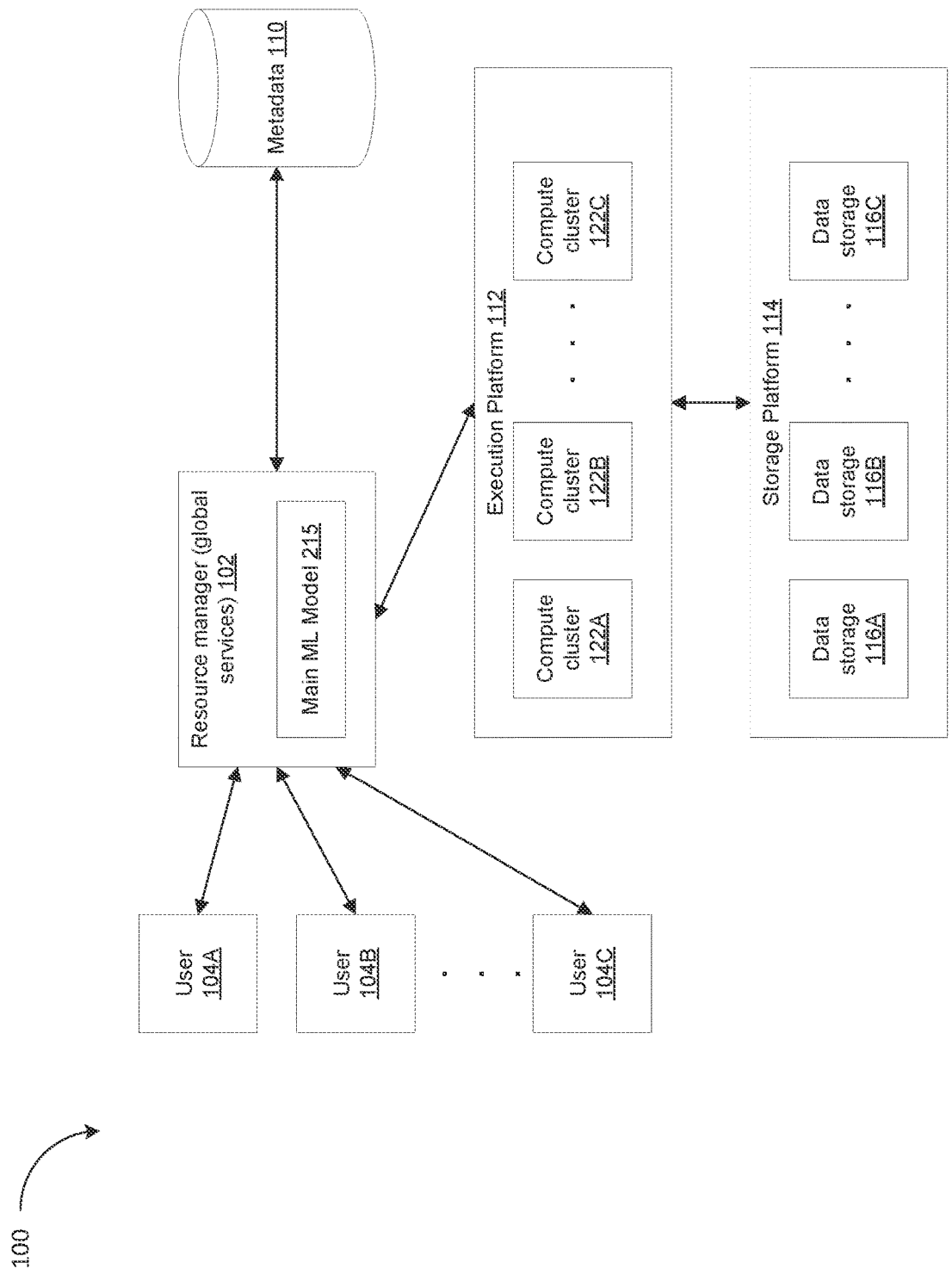
FIG. 1B is a block diagram that illustrates an example database system, in accordance with some embodiments of the present disclosure.

FIG. 1B illustrates the system 100 in accordance with some embodiments of the present disclosure. As can be seen in FIG. 1B, system 100 may implement a main ML model 215 which may perform various tasks in place of components of system 100. In the example of FIG. 1B, the main ML model 215 may be implemented within resource manager 102, where it may serve to automate the functions of any of a variety of components such as: query execution engines, resource predictors (e.g., for determining the optimal amount of resources to run a given query), query allocators (e.g., to handle allocation of tasks/micro-partitions of a query among compute clusters), a cardinality predictor, or a query optimizer (which may e.g., determine join order, or determine which table to select for the left/right side of the join operation). Although illustrated with a single main ML model 215 for ease of illustration and description, the functions/heuristics of all of the above components and others may be automated using one or more ML models. Although described as implemented within resource manager 102 for ease of illustration and description, it should be noted that the embodiments described herein may be implemented for any number of ML models replacing query processing components anywhere in system 100 (e.g., on the execution platform 114).

Resource manager 102 may train the main ML model 215 using a set of training data generated by executing a set of training queries on system 100 (including each of its components mentioned above). In some embodiments, the main ML model 215 may be trained outside of the resource manager 102. For example, the main ML model 215 may be trained on a separate computing device and uploaded to the resource manager 102. In another example, the main ML model 215 may be trained using automation. The set of training queries for the main ML model 215 may either be queries that customers commonly execute or queries that are purpose built for specific kinds of tasks. For example, if the main ML model 215 is simulating a resource predictor component, the set of training queries may include queries that are relevant to a resource predictor component. The set of training data may contain the features (i.e. feature vectors) of all training queries executed by the resource manager 102. Prior to deployment, the system 100 may also run a series of pre-release tests such as regression tests, stress tests, performance tests, and smoke tests, etc. These tests may typically be performed against a new version of system 100 before it is released to customers for use. Furthermore, the queries that these pre-release tests are comprised of may be executed repeatedly across different versions of system 100 and may cover a wide range of cases/scenarios. The resource manager 102 may tag the queries of the pre-release test that are most relevant to the main ML model 215 (in the examples of FIGS. 2 and 3, the main ML model 215 may automate a resource predictor component and thus resource manager 102 may tag queries that impact the prediction of the optimal amount of resources to run the query). During all pre-release testing, the resource manager 102 may collect all relevant result data from execution of the tagged queries and store it in a memory (not shown) of the system 100. Upon completion of the pre-release testing, the resource manager may deploy the system 100 with the main ML model 215. The main ML model 215 may be a binary classification model, a regression model, or any other suitable ML model depending on the component it is to simulate (e.g., resource predictor or query allocator).

However, if the system 100 (e.g., any component thereof) changes, the assumptions of the main ML model 215 may no longer be valid. For example, if the query optimizer component of the resource manager 102 has been modified (e.g., introduces a new type of join, or introduces new features like search optimization), then the main ML model 215 may require retraining, as such modifications may render the assumptions the main ML model 215 makes (which are based on its training data derived from a previous version of system 100 without modifications to the query optimizer) when predicting the resources required invalid. In other examples, if resource manager 102 changes the type of cloud virtual machine (VM) being used to implement any query processing components or modifies the functionality of the resource predictor component itself, then the main ML model 215's ability to accurately predict resource requirements may be negatively affected. The resource manager 102 can retrain the main ML model 215, however this process could take a significant amount of time (e.g., days or weeks), during which the main ML model 215 may continue to produce unreliable/inaccurate output.

Embodiments of the present disclosure utilize the pre-release testing results to train an error model that recognizes an error in an output of the main ML model 215 or an error in an input to the main ML model 215 caused by a new version of the system 100, and that may correct (adjust) the output of or input to the main ML model until the main ML model 215 has been retrained. In some embodiments where the error model adjusts the output of the main model, the error model is trained to recognize a magnitude of the error (drift) between the output of the main ML model 215 under the new version of system 100 version and the output of the main ML model 215 under the previous version. The error model may be trained on pre-release testing data as discussed herein. During operation of the new version of system 100, the error model may adjust the output of the main ML model 215 based on the magnitude of the error to ensure that the output of the main ML model 215 is accurate. The error model may adjust the output of the main ML model 215 in this way until the main ML model 215 has been retrained.

In other embodiments wherein the error model adjusts the input to the main ML model 215, the error model may be trained to recognize a magnitude of the error between the input to the main ML model 215 under the new version of system 100 version and the input to the main ML model 215 under the previous version. It should be noted that in some scenarios, even if the system 100 changes, the input features to the main ML model 215 will still be the same, although the output of the main ML model 215 will be different. Thus, error models that account for input feature drift may not capture cases where for the same (fixed) input features the drift causes changes only to the output (e.g. when a drift is a result of adopting different types of hardware for the virtual warehouses then aspects such as execution times or bottlenecks will be different from before).

Figure 2A:
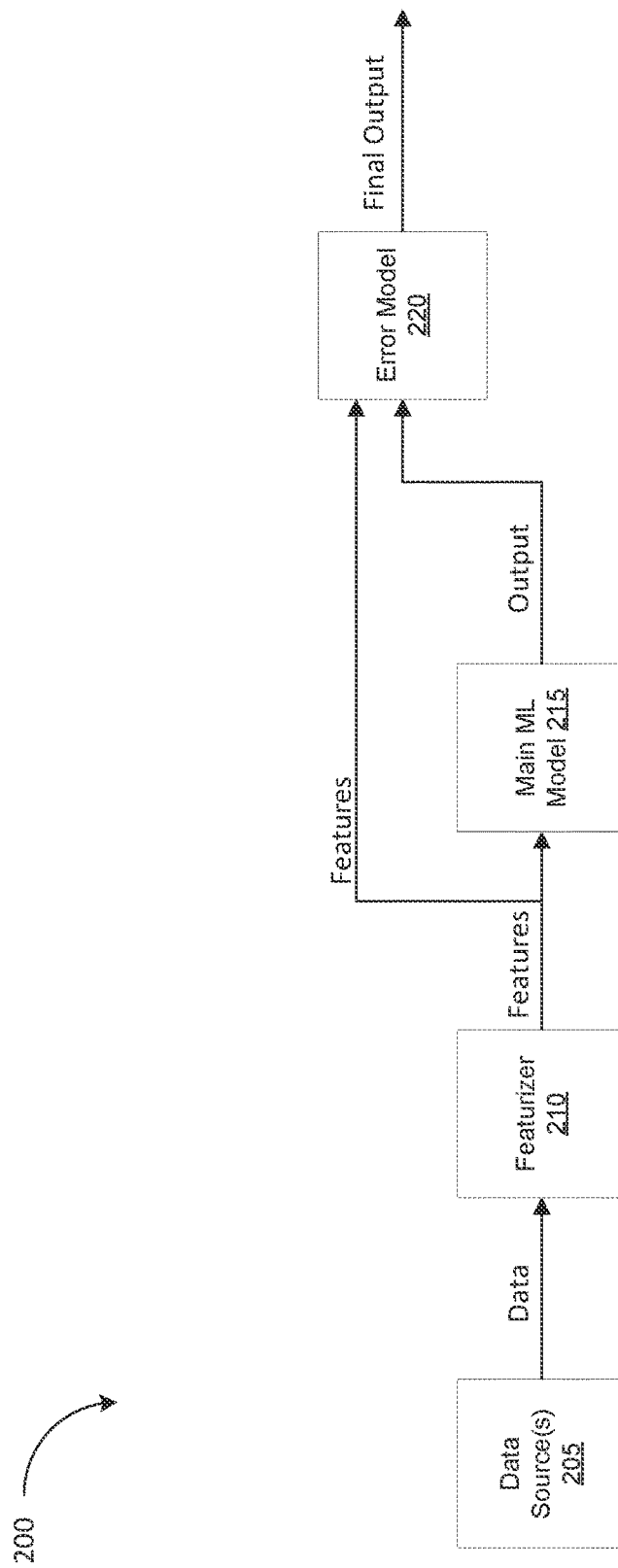
FIG. 2A is a block diagram that illustrates a logical implementation of a system for managing output drift of an ML model in an enterprise system, in accordance with some embodiments of the present disclosure.

FIG. 2A illustrates a block diagram of a logical implementation 200 of a system for managing output drift of an ML model in system 100. In response to a change in the system 100 (i.e., a new version of system 100 being implemented as a result of a change to one or more components of system 100), the resource manager 102 may re-execute the pre-release tests discussed herein on the new version of system 100 and store the result data for pre-release test queries that have been tagged as relevant to the main ML model 215 in memory. Resource manager 102 may now know the result data of executing the same pre-release tests over 2 different consecutive versions of system 100, and can compare the result data from the 2 executions to determine the difference (if any) in result data between execution of the pre-release tests on the old version of system 100 and the new version of system 100. A difference in result data (e.g., result data of the tagged queries) between the 2 consecutive executions of the pre-release testing may correspond to a drift (error) in the output of main ML model 215 (relative to the expected value) and the magnitude of the drift. The resource manager 102 may use this error data to train an error model 220 to recognize the magnitude of drift in the output of main ML model 215 with respect to the new version of system 100 and correct for such drift. It should be noted that the error model 220 does not need to solve the original problem, for example that of predicting the amount of resources required for a query. Instead, the error model 220 only needs to learn how much the result data will differ between two consecutive versions of system 100.

The error model 220 may be any appropriate ML model and need not be similar to the main ML model 215. Because the error model 220 recognizes the error (e.g., the output difference) of the main ML model 215 between consecutive versions of system 100, given a new instance of a problem (i.e. input features) and the output of the main ML model 215, the error model 220 may adjust the output of the main ML model 215 based on the magnitude of the main ML model 215's output drift (error) to produce a final output. In this way, resource manager 102 may minimize the time that the main ML model 215 is outputting inaccurate/drifted results after a new version of system 100 is deployed. The error model 220 may provide adjusted results by the time the new version of system 100 is released to users, without the need to re-execute all of the training queries and retrain the main ML model 215.

The error model 220 is deployed, alongside the main ML model 215 (as shown in FIG. 2). When the data source(s) 205 generate input data, a featurizer 210 (implemented as part of the resource manager 102) may take the input data from all of the data source(s) 205, and create input features (feature vectors) that describe the input data. The featurizer 210 may be synchronized with the main ML model 215 to ensure that the correct values and data types are fed to the main ML model 215. The featurizer 210 may output the input features to the main ML model 215. When the main ML model 215 receives the input features (e.g., original features of a query whose resource consumption is to be predicted), it may generate an output (e.g., a resource prediction) which is inaccurate because the main ML model 215 has not been trained based on the new version of system 100 (which includes e.g., an updated/modified version of the virtual machines used for the servers in the Execution Platform 112 and/or an updated/modified query optimizer component). Thus, the input features and output of the main ML model 215 may become the inputs to the error model 220 which may adjust the output of the main ML model 215 based on the magnitude of the main ML model 215's output drift (error) to produce a final output. Stated differently, the error model 220 may compute and output the final (adjusted) output as:

$$y\_error(i)=y\_Main(i)+error(i,y\_Main(i))$$

where y_Main (i) is the output of the main ML model 215, and error(i) is the output drift of the main ML model 215, for a problem-instance i (as determined by the error model 220).

In some embodiments, training queries from the main ML model 215's training set are re-executed on the new version of system 100 (as discussed herein, these may either be queries that customers commonly execute or queries that are purpose built for this kind of task). The resource manager 102 may determine a difference between the result data from this re-execution and the set of training data (resulting from execution of the set of training queries on the previous version of system 100) to retrain the error model 220 to further improve its accuracy. The new instance of the error model 220 may replace the previous instance of the error model 220. In addition, the result data from this re-execution may also become part of an updated (second) training data set to be used to retrain the main ML model 215. The re-execution of main ML model 215's training query set and subsequent retraining of the error model 220 may be repeated at a desired cadence.

Figure 2B:
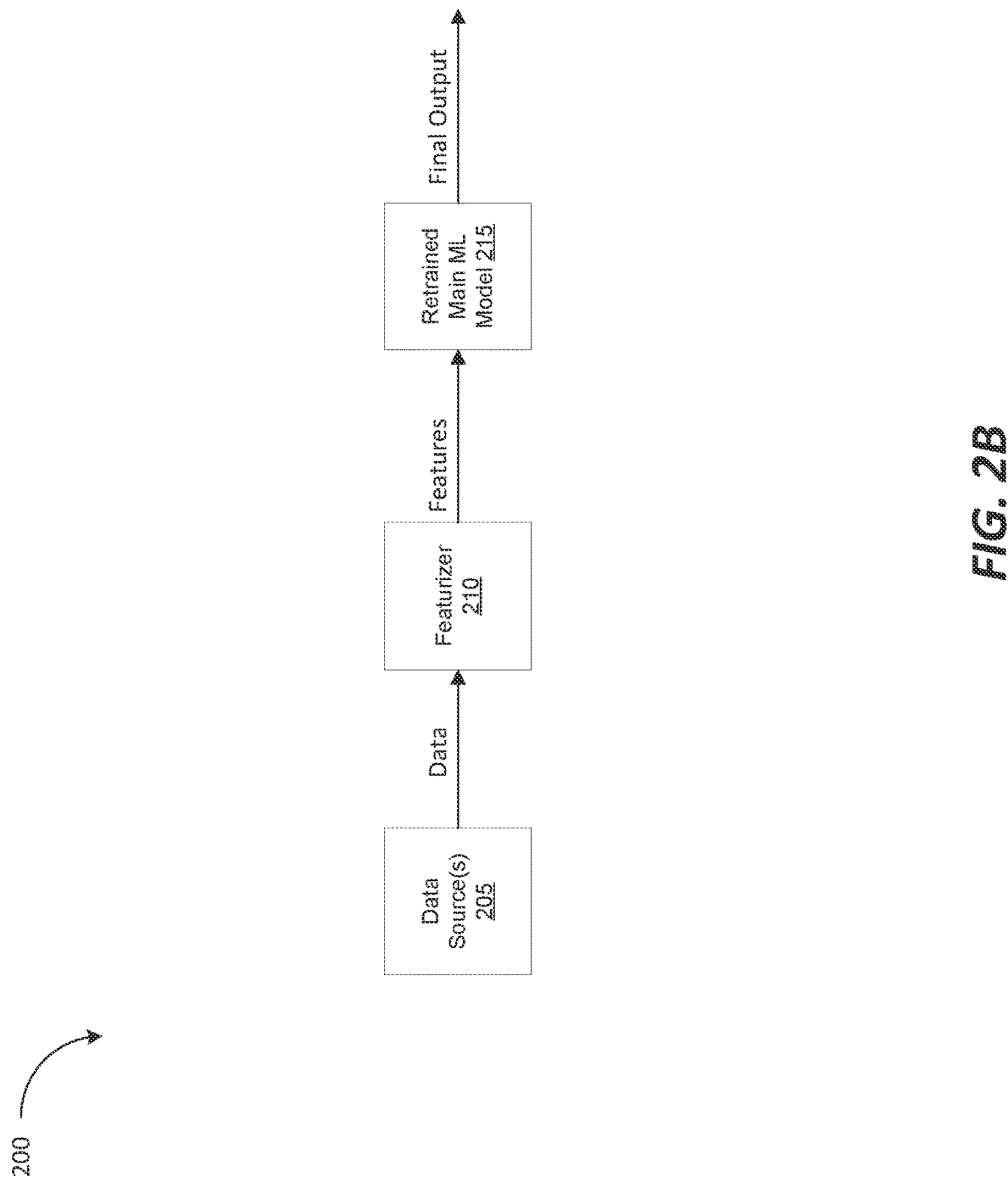
FIG. 2B is a block diagram that illustrates a logical implementation of a system where output drift of an ML model has been managed, in accordance with some embodiments of the present disclosure.

As the error model 220 continues operation (e.g., adjusting the output of main ML model 215), the resource manager 102 may retain all of the results (e.g., execution data) it has processed. Over time, a sufficient amount of result data may be retained which, in combination with the result data from the re-execution of the training queries from the main ML model 215's training set, may form an updated training data set. Resource manager 102 may utilize the updated training data set to retrain main ML model 215, and thereby generate a retrained main ML model 215. Upon generating a new retrained instance of the main ML model 215, the resource manager 102 may replace the previous instance of the main ML model 215 with the retrained instance of the main ML model 215 and remove the error model 220. System 100 may continue operation using only the retrained instance of the main ML model 215 as shown in FIG. 2B.

Figure 3A:
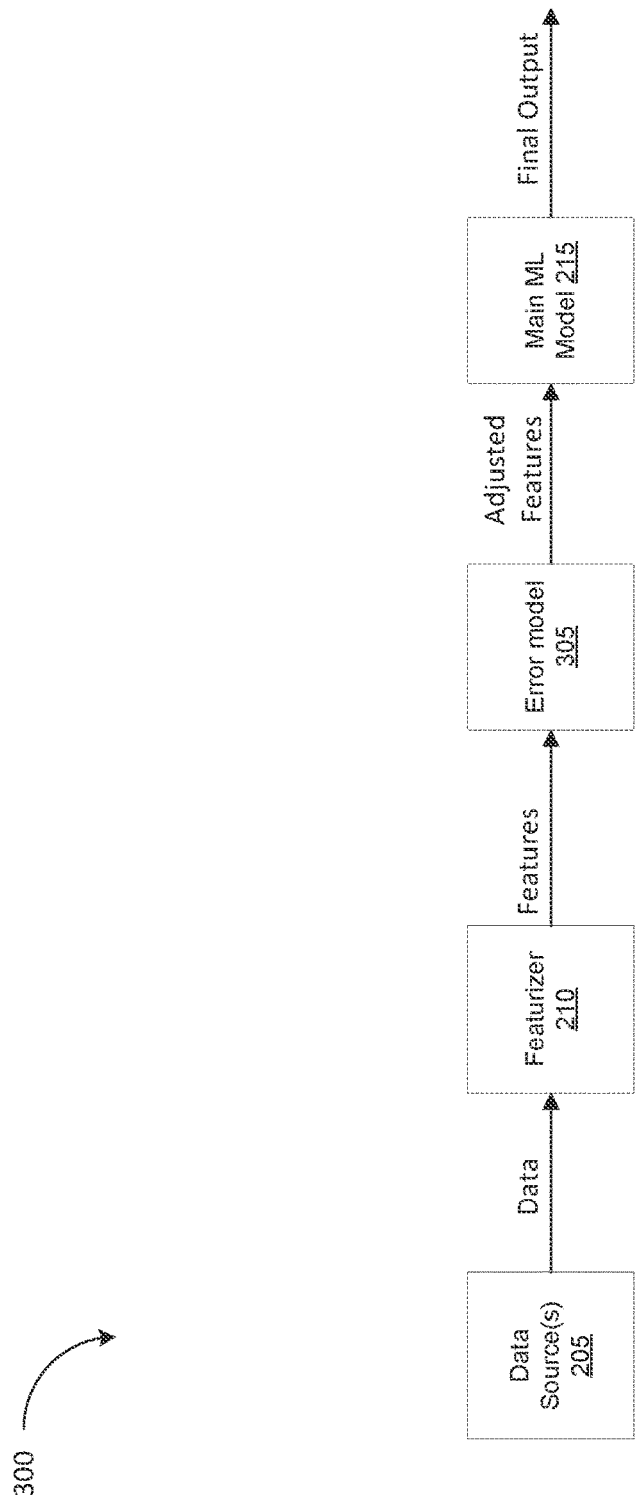
FIG. 3A is a block diagram that illustrates a logical implementation of a system for managing input feature drift for an ML model in an enterprise system, in accordance with some embodiments of the present disclosure.

FIG. 3A illustrates a block diagram of a logical implementation of main ML model 215 input correction techniques using an error model. The main ML model 215, featurizer 210, and the data source(s) 205 may be similar to the corresponding components in FIG. 2A. In response to a change in system 100, many of the assumptions of the main ML model 215 regarding input data may no longer be valid. For example, if the query optimizer component of the resource manager 102 has been modified (e.g., introduces new type of join, or introduces new features such as search optimization), then the main ML model 215 needs to be retrained, because these modifications may affect the data input to the main ML model 215 (which is simulating the functions of a resource prediction component).

Thus, in response to a change in the system 100, resource manager 102 may re-execute the pre-release tests discussed herein on the new version of system 100 and store the result data for pre-release test queries that have been tagged as relevant to the main ML model 215 in memory. In the example of FIG. 3A, the result data may include the data that is input to the main ML model 215 as well as the data output by the main ML model 215. Resource manager 102 may now know the data input to the main ML model 215 when executing the same pre-release tests over 2 different consecutive versions of system 100, and can compare the result data (e.g., result data of tagged queries) from the 2 executions to determine the difference (if any) in input data to main ML model 215 between execution of the pre-release tests on the old version of system 100 and the new version of system 100. A difference in input data to main ML model 215 between the 2 consecutive executions of the pre-release testing may correspond to a drift (error) in the input data of main ML model 215 executing on the new version of system 100 and the magnitude of the drift. The resource manager 102 may use this error data to train an error model 305 to recognize the drift in the input of main ML model 215 and correct for such drift. The error model 305 does not need to solve the original problem of determining the inputs to the ML model, and only needs to learn how much the main ML model 215 input will differ between the two consecutive versions of system 100.

The error model 305 may be any appropriate ML model and need not be similar to the main ML model 215. Because the error model 305 recognizes the error in the input data to the main ML model 215 between consecutive versions of system 100, given a new instance of a problem (i.e. input features), the error model 220 may adjust the input features to the main ML model 215 based on the magnitude of the input feature drift (error) to produce adjusted input features. In this way, resource manager 102 may minimize the time that the main ML model 215 is receiving inaccurate input data (and as a result, outputting inaccurate/drifted results). The error model 305 may provide adjusted input data to the main ML model 215 by the time the new version of system 100 is released to users, without the need to re-execute all of the training queries and retrain the main ML model 215.

The error model 305 is deployed alongside the main ML model 215 (as shown in FIG. 3A). When the data source(s) 205 generate input data, the featurizer 210 may take the input from all of the data source(s) 205, and generate input features that comprise original feature vectors that describe the input data. The error model 305 receives the input features (e.g., original features of a query whose resource consumption is to be predicted), and may adjust the input features to generate adjusted input features. More specifically, the error model 305 computes and outputs the new values of the input features to the main ML model 215 (as opposed to the output), which is then passed to the main ML model 215. The main ML model 215 may produce a final output given as:

$$y_{Main}(y_{Error}(i))$$

where y_Main (i) is the output of the main ML model 215, and y_Error (i) is the output of the error model 305, for an instance i.

In some embodiments, training queries from the main ML model 215's training set are re-executed on the new version of system 100 (as discussed herein, these may either be queries that customers commonly execute or queries that are purpose built for this kind of task). The resource manager 102 may determine a difference between the result data (input features) from this re-execution and the set of training data (resulting from execution of the set of training queries on the previous version of system 100) to retrain the error model 305 to further improve its accuracy. The new instance of the error model 305 may replace the previous error model 305. In addition, the result data from this re-execution may also become part of an updated (second) training data set to be used to retrain the main ML model 215. The re-execution of main ML model 215's training query set and subsequent retraining of the error model 305 may be repeated at a desired cadence.

Figure 3B:
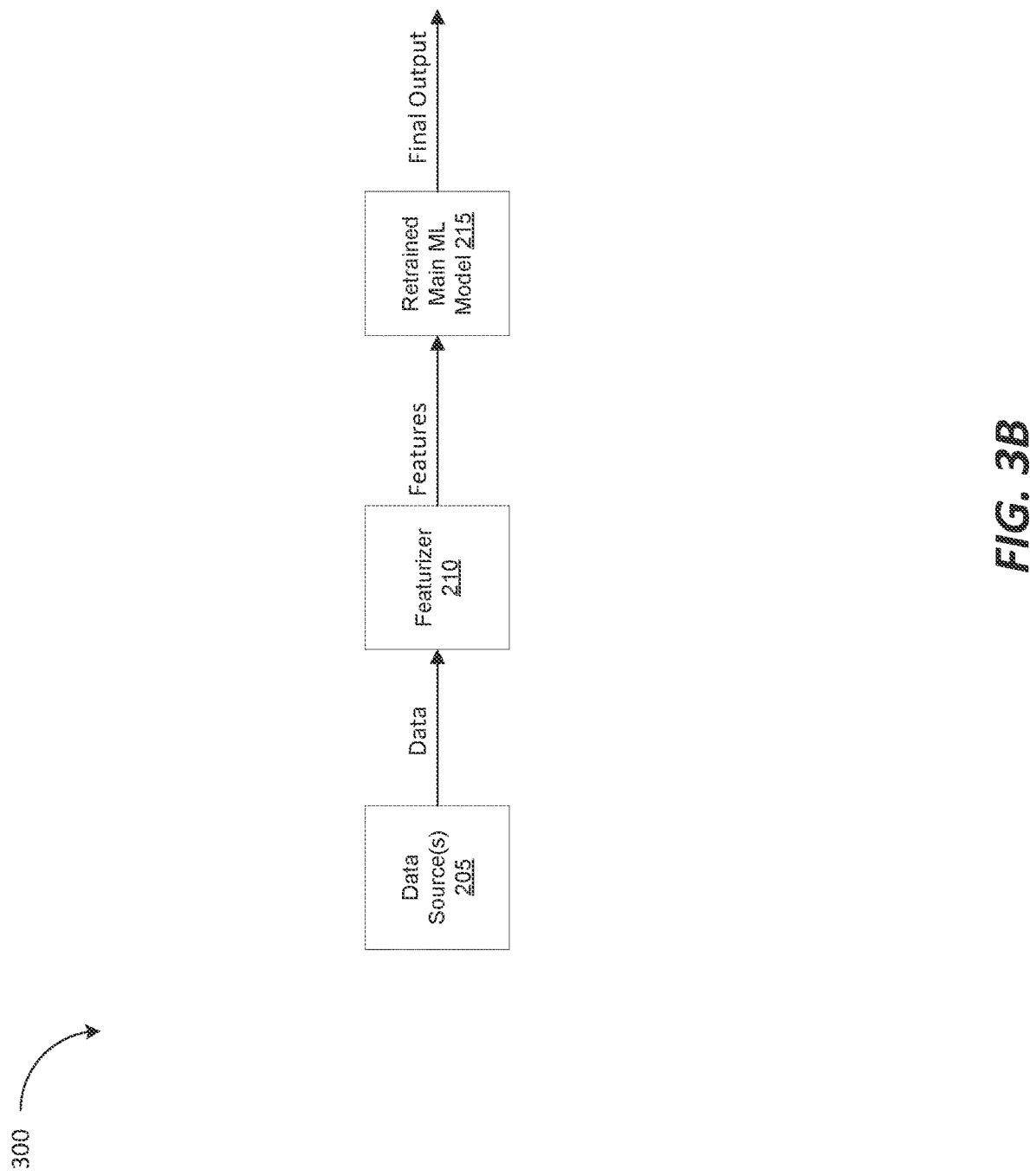
FIG. 3B is a block diagram that illustrates a logical implementation of a system where input feature drift for an ML model has been managed, in accordance with some embodiments of the present disclosure.

As error model 305 continues operation (e.g., adjusting the input data of main ML model 215), resource manager 102 may retain all of the results (e.g., adjusted inputs) it has processed. Over time, a sufficient amount of result data may be retained which, in combination with the result data from the re-execution of the training queries from the main ML model 215's training set, may form an updated training data set. Resource manager 102 may utilize the new training data set to retrain main ML model 215, and thereby generate a retrained main ML model 215. Upon generating a retrained main ML model 215, the resource manager 102 may replace the previous main ML model 215 with the retrained main ML model 215 and remove the error model 305. System 100 may continue operation using only the retrained main ML model 215 as shown in FIG. 3B.

Figure 4:
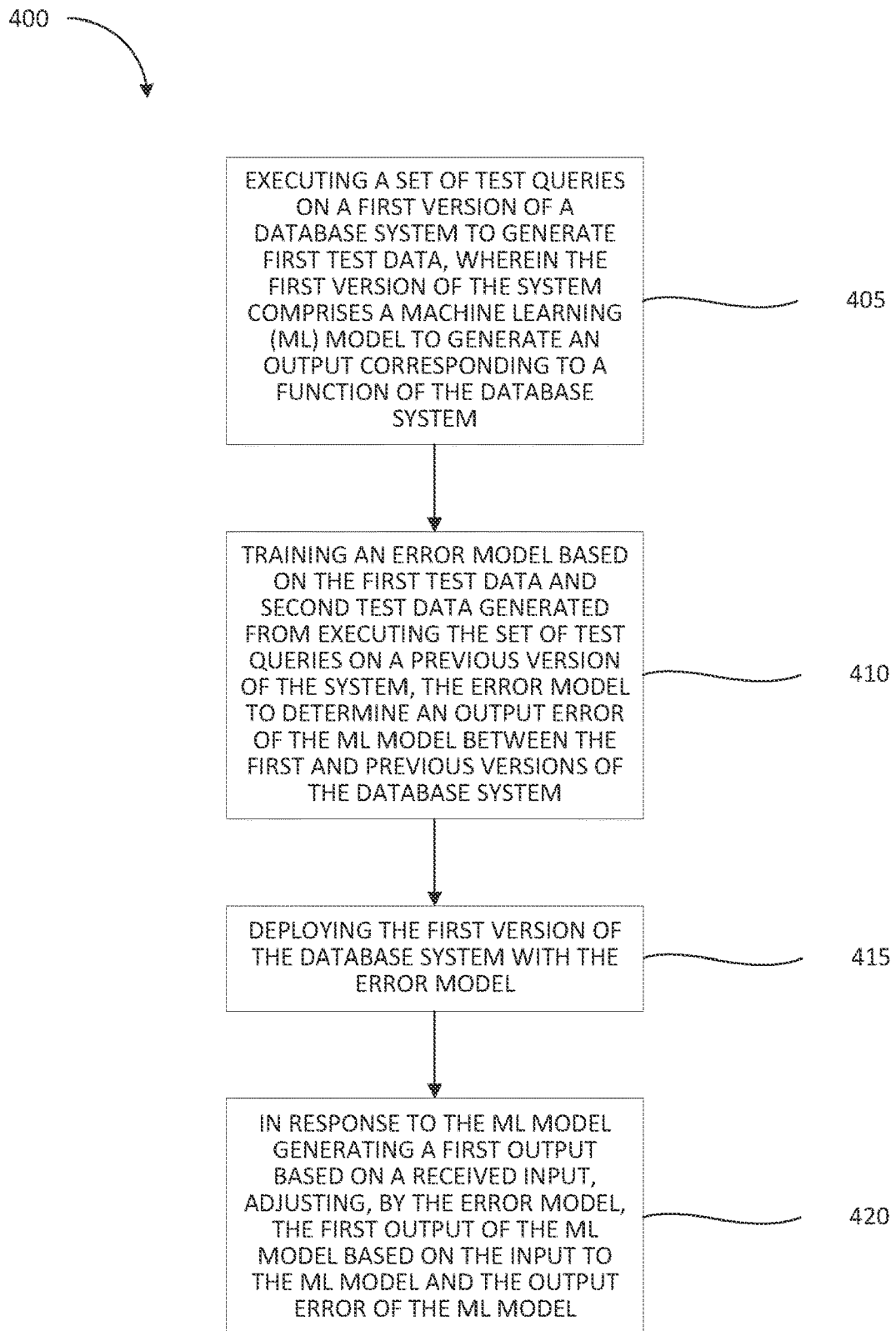
FIG. 4 is a flow diagram of a method for managing output drift of an ML model in an enterprise system, in accordance with some embodiments of the present disclosure.

FIG. 4 is a flow diagram of a method 400 of managing output drift of an ML model in an enterprise system, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., resource manager 102 illustrated in FIGS. 1A and 1B).

With reference to FIGS. 2A and 2B as well, the method 400 begins at block 405 where, in response to a change in the system 100 (i.e., a new version of system 100 being implemented as discussed herein), the resource manager 102 may re-execute the pre-release tests discussed herein on the new version (also referred to herein as the "first version") of system 100 and store the result data for pre-release test queries that have been tagged as relevant to the main ML model 215 (also referred to herein as "first test data") in memory. Resource manager 102 may now know the result data of executing the same pre-release tests over 2 different consecutive versions of system 100, and can compare the result data from the 2 executions to determine the difference in result data between execution of the pre-release tests on the previous version of system 100 and the new version of system 100. The resource manager 102 may utilize the result data (e.g., result data of tagged queries) from the 2 consecutive executions of the pre-release testing to determine whether there is a drift (error) in the output of main ML model 215 (relative to the expected value) and the magnitude of the drift. At block 410, the resource manager 102 may use this error data to train an error model 220 to recognize the amount of drift in the output of main ML model 215 between the previous version of system 100 and the new version of system 100 and correct for such drift. It should be noted that the error model 220 does not need to solve the original (perhaps difficult) problem of predicting the amount of resources required for a query. Instead, the error model 220 only needs to learn how much the results will differ between two consecutive versions of system 100.

At block 415, the new version of the system 100 is deployed with the error model 220 included alongside the main ML model 215 (as shown in FIG. 2A). When the data source(s) 205 generate input data, a featurizer 210 (implemented as part of the resource manager 102) may take the input data from all of the data source(s) 205, and create input features (feature vectors) that describe the input data. The featurizer 210 may be synchronized with the main ML model 215 to ensure that the correct values and data types are fed to the main ML model 215. The featurizer 210 may output the input features to the main ML model 215. When the main ML model 215 receives the input features (e.g., original features of a query whose resource consumption is to be predicted), it may generate an output (e.g., a resource prediction) which is inaccurate because the main ML model 215 has not been trained based on the new version of system 100 (which includes e.g., an updated/modified version of the virtual machines used for the servers in the execution platform 112 and/or an updated/modified query optimizer component). Thus, at block 420, the input features and output of the main ML model 215 may become the inputs to the error model 220 which may adjust the output of the main ML model 215 based on the magnitude of the main ML model 215's output drift (error) to produce a final output. Stated differently, the error model 220 may compute and output the final (adjusted) output as:

$$y\_Yerror(i)=y\_Main(i)+error(i,y\_Main(i))$$

where y_Main (i) is the output of the main ML model 215, and error(i) is the output drift of the main ML model 215, for a problem-instance i (as determined by the error model 220).

In some embodiments, training queries from the main ML model 215's training set are re-executed on the new version of system 100 (as discussed herein, these may either be queries that customers commonly execute or queries that are purpose built for this kind of task). The resource manager 102 may determine a difference between the result data from this re-execution and the set of training data (resulting from execution of the set of training queries on the previous version of system 100) to retrain the error model 220 to further improve its accuracy. The new instance of the error model 220 may replace the previous instance of the error model 220. In addition, the result data from this re-execution may also become part of an updated (second) training data set to be used to retrain the main ML model 215. The re-execution of main ML model 215's training query set and subsequent retraining of the error model 220 may be repeated at a desired cadence.

As the error model 220 continues operation (e.g., adjusting the output of main ML model 215), the resource manager 102 may retain all of the results (e.g., adjusted outputs) it has processed. Over time, a sufficient amount of result data may be retained which, in combination with the result data from the re-execution of the training queries from the main ML model 215's training set, may form an updated training data set. Resource manager 102 may utilize the updated training data set to retrain main ML model 215, and thereby generate a retrained main ML model 215. Upon generating a new retrained instance of the main ML model 215, the resource manager 102 may replace the previous instance of the main ML model 215 with the retrained instance of the main ML model 215 and remove the error model 220. System 100 may continue operation using only the retrained instance of the main ML model 215 as shown in FIG. 2B.

Figure 5:
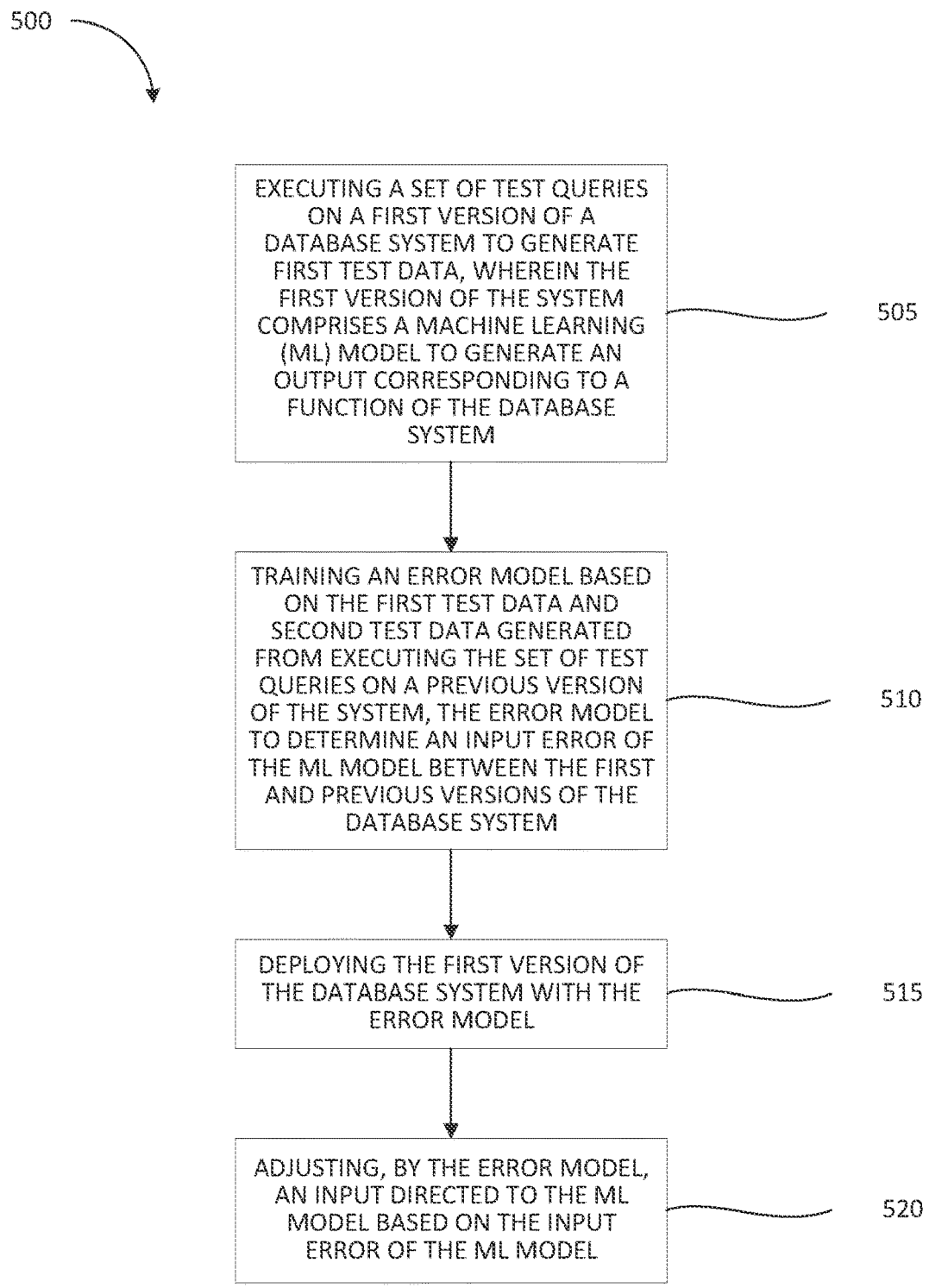
FIG. 5 is a flow diagram of a method for managing input feature drift for an ML model in an enterprise system, in accordance with some embodiments of the present disclosure.

FIG. 5 is a flow diagram of a method 500 of managing output drift of an ML model in an enterprise system, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., resource manager 102 illustrated in FIGS. 1A and 1B).

Referring also to FIGS. 3A and 3B, at block 505, in response to a change in the system 100, resource manager 102 may re-execute the pre-release tests discussed herein on the new version of system 100 and store the result data for pre-release test queries that have been tagged as relevant to the main ML model 215 (also referred to herein as "first test data") in memory. In the example of FIG. 3A, the result data may include the data that is input to the main ML model 215 as well as the data output by the main ML model 215. Resource manager 102 may now know the data input to the main ML model 215 when executing the same pre-release tests over 2 different consecutive versions of system 100, and can compare the result data from the 2 executions to determine the difference in input data to main ML model 215 between execution of pre-release tests on the previous version of system 100 and the new version of system 100. The resource manager 102 may utilize the result data (e.g., result data of tagged queries) from the 2 consecutive executions of the pre-release testing to determine whether there is a drift (error) in the input data of main ML model 215 and the magnitude of the drift. At block 510, the resource manager 102 may use this error data to train an error model 305 to recognize the drift in the input of main ML model 215 between the previous version of system 100 and the new version of system 100 and correct for such drift. The error model 305 does not need to solve the original problem of determining the inputs to the ML model, and only needs to learn how much the main ML model 215 input will differ between two consecutive versions of system 100.

At block 515, the new system version is deployed with error model 305 alongside the main ML model 215 (as shown in FIG. 3A). When the data source(s) 205 generate input data, the featurizer 210 may take the input from all of the data source(s) 205, and generate input features that comprise original feature vectors that describe the input data. The error model 305 receives the input features (e.g., original features of a query whose resource consumption is to be predicted), and at block 520, may adjust the input features to generate adjusted input features. More specifically, the error model 305 computes and outputs the new values of the input features to the main ML model 215 (as opposed to the output), which is then passed to the main ML model 215. The main ML model 215 may produce a final output given as:

$$y_{Main}(y_{Error}(i))$$

where y_Main (i) is the output of the main ML model 215, and y_Error (i) is the output of the error model 305, for an instance i.

In some embodiments, training queries from the main ML model 215's training set are re-executed on the new version of system 100 (as discussed herein, these may either be queries that customers commonly execute or queries that are purpose built for this kind of task). The resource manager 102 may determine a difference between the result data (input features) from this re-execution and the set of training data (resulting from execution of the set of training queries on the previous version of system 100) to retrain the error model 305 to further improve its accuracy. The new instance of the error model 305 may replace the previous error model 305. In addition, the result data from this re-execution may also become part of an updated (second) training data set to be used to retrain the main ML model 215. The re-execution of main ML model 215's training query set and subsequent retraining of the error model 305 may be repeated at a desired cadence.

As error model 305 continues operation (e.g., adjusting the input features of main ML model 215), resource manager 102 may retain all of the results (e.g., adjusted inputs) it has processed. Over time, a sufficient amount of result data may be retained which, in combination with the result data from the re-execution of the training queries from the main ML model 215's training set, may form an updated training data set. Resource manager 102 may utilize the new training data set to retrain main ML model 215, and thereby generate a retrained main ML model 215. Upon generating a retrained main ML model 215, the resource manager 102 may replace the previous main ML model 215 with the retrained main ML model 215 and remove the error model 305. System 100 may continue operation using only the retrained main ML model 215 as shown in FIG. 3B.

Figure 6:
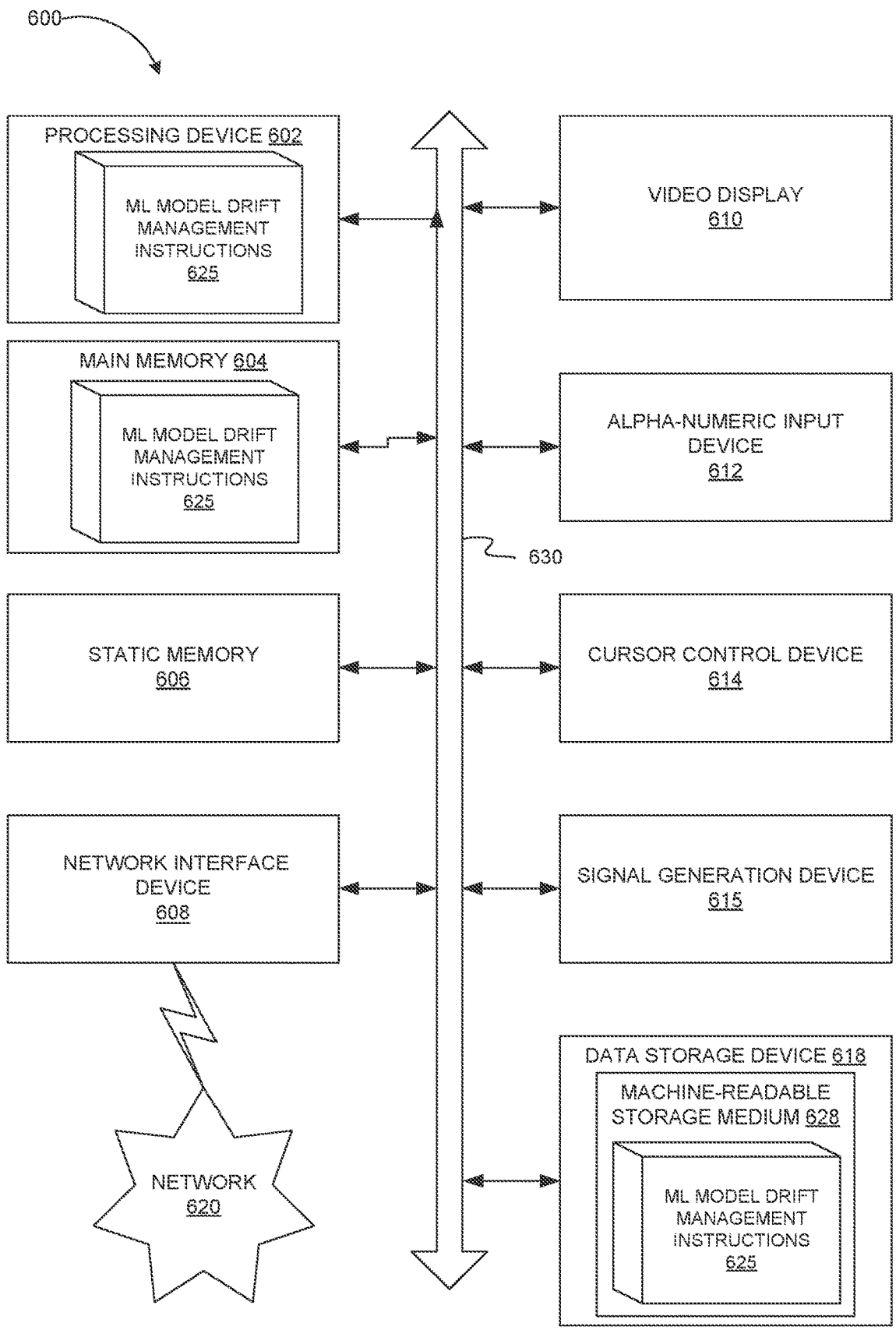
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein for verifying firmware before it is loaded to a memory device, in accordance with some embodiments. For example, computing device 600 may execute a set of test queries on a first version of a database system to generate first test data, wherein the first version of the system comprises a machine learning (ML) model to generate an output corresponding to a function of the database system. The computing device 600 may train an error model based on the first test data and second test data generated from executing the set of test queries on a previous version of the system, the error model to determine an output error of the ML model between the first and previous versions of the database system. The computing device 600 may deploy the first version of the database system with the error model and, in response to the ML model generating a first output based on a received input, may adjust, by the error model, the first output of the ML model based on the input to the ML model and the output error of the ML model.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 615 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of ML model drift management instructions 625, e.g., instructions for carrying out the operations described herein, in accordance with one or more aspects of the present disclosure. ML model drift management instructions 625 may also reside, completely or at least partially, within main memory 604 and/or within processing device 602 during execution thereof by computing device 600, main memory 604 and processing device 602 also constituting computer-readable media. The ML model drift management instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
executing a set of test queries on a first version of a database system, the database system comprising a machine learning (ML) model to generate an output corresponding to a function of the database system, wherein the ML model generates first test data in response to execution of the set of test queries on the first version of the database system;
training an error ML model based on the first test data and second test data generated by the ML model in response to execution of the set of test queries on a previous version of the database system, the error ML model to determine an error associated with the output of or an input to the ML model between the first version of the database system and the previous version of the database system; and
when the error is associated with the output of the ML model:
in response to receiving a first input to the ML model, processing the first input using the ML model to generate a first output; and
adjusting, by the error ML model, the first output based on the first input to the ML model and the error associated with the output of the ML model.

2. The method of claim 1, further comprising:
generating training data based at least in part on one or more adjusted outputs of the error ML model accumulated over time;
retraining the ML model based on the training data to generate a retrained ML model; and
replacing the ML model with the retrained ML model.

3. The method of claim 2, further comprising:
removing the error ML model from the first version of the database system.

4. The method of claim 2, further comprising:
executing a set of training queries of the ML model on the first version of the database system to generate third test data;
retraining the error ML model based on the third test data to generate an updated error ML model; and
replacing the error ML model with the updated error ML model.

5. The method of claim 4, wherein generating the training data comprises adding the third test data to the one or more adjusted outputs of the error ML model accumulated over time.

6. The method of claim 1, further comprising:
when the error is associated with the input to the ML model:
adjusting, by the error ML model, an input directed to the ML model based on the input directed to the ML model and the error associated with the input of the ML model; and
outputting the adjusted input to the ML model.

7. The method of claim 6, further comprising:
generating training data based at least in part on one or more adjusted inputs of the error ML model accumulated over time;
retraining the ML model based on the training data to generate a retrained ML model; and
replacing the ML model with the retrained ML model.

8. The method of claim 1, wherein the set of test queries comprise test queries tagged by the database system as relevant to the ML model.

9. The method of claim 1, wherein the function comprises one of: a query execution engine, a query optimizer, or a resource predictor.

10. A system comprising:
a memory; and
a processing device operatively coupled to the memory, the processing device to:
execute a set of test queries on a first version of a database system, the database system comprising a machine learning (ML) model to generate an output corresponding to a function of the database system, wherein the ML model generates first test data in response to execution of the set of test queries on the first version of the database system;
train an error ML model based on the first test data and second test data generated by the ML model in response to execution of the set of test queries on a previous version of the database system, the error ML model to determine an error associated with an output of or an input to the ML model between the first version of the database system and the previous version of the database system; and
when the error is associated with the output of the ML model:
in response to receiving a first input to the ML model, process the first input using the ML model to generate a first output; and
adjust, by the error ML model, the first output based on the first input to the ML model and the error associated with the output of the ML model.

11. The system of claim 10, wherein the processing device is further to:
generate training data based at least in part on one or more adjusted outputs of the error ML model accumulated over time;
retrain the ML model based on the training data to generate a retrained ML model; and
replace the ML model with the retrained ML model.

12. The system of claim 11, wherein the processing device is further to:
remove the error ML model from the first version of the database system.

13. The system of claim 11, wherein the processing device is further to:
execute a set of training queries of the ML model on the first version of the database system to generate third test data;
retrain the error ML model based on the third test data to generate an updated error ML model; and
replace the error ML model with the updated error ML model.

14. The system of claim 13, wherein to generate the training data, the processing device is to add the third test data to the one or more adjusted outputs of the error ML model accumulated over time.

15. The system of claim 10, wherein the processing device is further to:

when the error is associated with the input to the ML model:
adjust, by the error ML model, an input directed to the ML model based on the input error of the ML model; and
output the adjusted input to the ML model.

16. The system of claim 15, wherein the processing device is further to:
generate training data based at least in part on one or more adjusted inputs of the error ML model accumulated over time;
retrain the ML model based on the training data to generate a retrained ML model; and
replace the ML model with the retrained ML model.

17. The system of claim 10, wherein the set of test queries comprise test queries tagged by the database system as relevant to the ML model.

18. The system of claim 10, wherein the function comprises one of: a query execution engine, a query optimizer, or a resource predictor.

19. A non-transitory computer-readable medium, having instructions stored thereon which, when executed by a processing device, cause the processing device to:
execute a set of test queries on a first version of a database system, the database system comprising a machine learning (ML) model to generate an output corresponding to a function of the database system, wherein the ML model generates first test data in response to execution of the set of test queries on the first version of the database system;
train an error ML model based on the first test data and second test data generated by the ML model in response to execution of the set of test queries on a previous version of the database system, the error ML model to determine an error associated with an output of or an input to the ML model between the first version of the database system and the previous version of the database system; and
when the error is associated with the output of the ML model:
in response to receiving a first input to the ML model, process the first input using the ML model to generate a first output; and
adjust, by the error ML model, the first output based on the first input to the ML model and the error associated with the output of the ML model.

20. The non-transitory computer-readable medium of claim 19, wherein the processing device is further to:
generate training data based at least in part on one or more adjusted outputs of the error ML model accumulated over time;
retrain the ML model based on the training data to generate a retrained ML model; and
replace the ML model with the retrained ML model.

* * * * *